(12) United States Patent
Crowley et al.

(10) Patent No.: US 10,482,534 B2
(45) Date of Patent: Nov. 19, 2019

(54) METHOD AND SYSTEM FOR AGGREGATING AND MANAGING DATA FROM DISPARATE SOURCES IN CONSOLIDATED STORAGE

(71) Applicant: FTEN, Inc., New York, NY (US)

(72) Inventors: Brian Crowley, Oyster Bay, NY (US); Valerie Bannert-Thurner, Winchester (GB); Jason Timmes, Wheat Ridge, CO (US)

(73) Assignee: FTEN INC., New York, NY (US)

( * ) Notice: Subject to any disclaimer, the term of this patent is extended or adjusted under 35 U.S.C. 154(b) by 0 days.

(21) Appl. No.: 16/193,026

(22) Filed: Nov. 16, 2018

(65) Prior Publication Data

US 2019/0087900 A1 Mar. 21, 2019

Related U.S. Application Data

(63) Continuation of application No. 13/719,949, filed on Dec. 19, 2012, now abandoned.

(60) Provisional application No. 61/577,188, filed on Dec. 19, 2011.

(51) Int. Cl.
*G06Q 40/00* (2012.01)
*G06Q 40/04* (2012.01)

(52) U.S. Cl.
CPC .................. *G06Q 40/04* (2013.01)

(58) Field of Classification Search
USPC .......... 703/35; 705/36, 38, 39, 37; 709/206, 709/204, 224, 223; 715/716; 707/731
See application file for complete search history.

(56) References Cited

U.S. PATENT DOCUMENTS

| | | | | |
|---|---|---|---|---|
| 6,253,203 B1* | 6/2001 | O'Flaherty | .......... | G06F 21/6245 |
| 6,598,161 B1* | 7/2003 | Kluttz | ................. | G06F 21/6209 |
| | | | | 713/166 |
| 6,850,252 B1* | 2/2005 | Hoffberg | ............ | G06K 9/00369 |
| | | | | 348/E7.061 |
| 7,130,885 B2* | 10/2006 | Chandra | ................ | G06Q 10/10 |
| | | | | 709/206 |
| 7,349,987 B2* | 3/2008 | Redlich | .................... | H04L 9/085 |
| | | | | 709/206 |
| 7,797,381 B2* | 9/2010 | Zhang | ..................... | G06Q 30/06 |
| | | | | 705/1.1 |
| 8,332,638 B2* | 12/2012 | Orsini | ..................... | G06F 21/31 |
| | | | | 713/167 |

(Continued)

*Primary Examiner* — Tien C Nguyen
(74) *Attorney, Agent, or Firm* — Nixon & Vanderhye P.C.

(57) ABSTRACT

Non-limiting example embodiments include methods and systems for acquiring private financial data from multiple disparate sources. The private financial data is normalized, aggregated, preferably enhanced, and stored in secure storage. Entitled entities may retrieve selected private financial data from that secure storage efficiently, flexibility, and rapidly. Examples of financial private data include non-liquidity destination related sources of private data as well as liquidity destination related sources. A non-limiting example of a computer-implemented, consolidated, private financial data service is based on a secure, permission-based, aggregated and consolidated data cloud, which enables provision/distribution to one or more authorized parties with legitimate interests selected portions of the consolidated, private financial data.

16 Claims, 8 Drawing Sheets

(56) References Cited

U.S. PATENT DOCUMENTS

| | | | |
|---|---|---|---|
| 8,601,498 B2* | 12/2013 | Laurich | G06F 21/602 |
| | | | 719/326 |
| 8,799,022 B1* | 8/2014 | O'Brien | G06Q 10/10 |
| | | | 705/2 |
| 2002/0156638 A1 | 10/2002 | Guedri et al. | |
| 2007/0288662 A1 | 12/2007 | Chen | |
| 2010/0076888 A1 | 3/2010 | Ernst et al. | |
| 2010/0106646 A1 | 4/2010 | Passeri et al. | |
| 2010/0199042 A1 | 8/2010 | Bates et al. | |
| 2011/0166982 A1 | 7/2011 | Cole et al. | |
| 2012/0022997 A1 | 1/2012 | Vasinkevich | |
| 2012/0102053 A1 | 4/2012 | Barrett et al. | |
| 2012/0173867 A1* | 7/2012 | Hirabayashi | G06F 21/51 |
| | | | 713/150 |
| 2013/0212103 A1* | 8/2013 | Cao | G06F 16/215 |
| | | | 707/737 |
| 2014/0006244 A1 | 1/2014 | Crowley et al. | |
| 2014/0164378 A1* | 6/2014 | Levandoski | G06F 16/25 |
| | | | 707/737 |

* cited by examiner

METHOD AND SYSTEM FOR AGGREGATING AND MANAGING DATA FROM DISPARATE SOURCES IN CONSOLIDATED STORAGE

This application is a continuation of U.S. patent application Ser. No. 13/719,949, filed Dec. 19, 2012, which claims the benefit of U.S. Provisional Patent Application No. 61/577,188, filed on Dec. 19, 2011, the entire contents of each of which both are incorporated herein by reference.

TECHNOLOGY OVERVIEW

The technology aggregates, stores, and preferably selectively processes private data, e.g., private financial data, from disparate sources to provide enhanced management, storage, and directed delivery of such data for users.

BACKGROUND

Changes in market dynamics, such as the increasing speed at which trading occurs and the resulting speed in which "bad things" can happen, (e.g., a 1,000 point plunge in the Dow Jones Industrial Average—about 9%—in less than 10 minutes only to recover those losses within minutes), require that data be collected and available for analysis within an ever decreasing period of time and to a wider array of parties who have a legitimate interest in the data. What used to be acceptable to do the next day, at the end of the current day, or even at regular intervals throughout the day must be completed in real-time throughout the day and made available to an expanded group of people who have a legitimate interest in different elements or combinations of financial trading related data from a large number of disparate sources of such data—all within a very brief period of time. These disparate sources employ different data formats and protocols making centralized and effective use difficult. As a result, pre-existing methods of storing, accessing, managing different elements or combinations of financial trading related data from a large number of disparate sources of such data, and delivering appropriate data to specified recipients, who may be within and/or outside of a designated organization and entitled to see different elements and/or combinations of such data, are quite slow and often ineffective.

SUMMARY

Non-limiting example embodiments include methods and systems for acquiring and aggregating private financial data from multiple disparate sources. The private financial data is normalized, aggregated, preferably enhanced, and stored in secure storage. Entitled entities may retrieve selected private financial data from that secure storage efficiently, flexibly, and rapidly. Examples of financial private data include non-liquidity destination related sources of private data as well as liquidity destination related sources. A non-limiting example of a computer-implemented, consolidated, private financial data service is based on a secure, permission-based, aggregated and consolidated data cloud, which enables provision/distribution to one or more authorized parties with legitimate interests selected portions of the consolidated, private financial data.

An information processing system having multiple processors receives from multiple data sources private financial data related to financial articles of trade that are tradable on one or more financial markets. Private financial data is exclusively accessible by only a set of entitled entities associated with the private financial data or transactions involving the private financial data. The received private financial data from the multiple data sources includes multiple different data formats. The information processing system normalizes the private financial data in multiple different data formats received from the multiple data sources into a normalized data format and stores the normalized private financial data in storage associated with the information processing system. The normalized private financial data is processing using public financial data to provide enhanced private financial data, which is stored. In a preferred but example embodiment, the normalized private financial data is encrypted before storage. The information processing system distributes selected portions of the enhanced private financial data to entitled entities with legitimate rights to the selected portions of the enhanced private financial data. As a non-limiting example, the distributing step includes distributing selected portions of the enhanced private financial data to one or more financial regulatory entities.

Examples of the private financial data includes one or more of: transactional data, margin requirements or calls, trading position information, ownership information, or a status of third parties as guarantors of, or providers of credit for, specified transactions. Examples of public financial data include one or more of: trading market data, trading reference data, an identity of regulators with a legal right to private financial data as authorized by owners of the private financial data, or guarantors or creditors of transactions giving rise to private financial data. Examples of multiple data sources include multiple public trading exchanges and one or more dark pools, and wherein the private financial data is provided in drop copy files associated with the multiple public trading exchanges and the one or more dark pools.

In example embodiments, the normalized private financial data is processed with other, more static private financial data that includes one or more of: custom haircuts, allocation relationships, mappings between clearing and trading accounts, overnight positions, posted collateral, or margin. In example embodiments, the normalized private financial data is processed with public trading market and trading reference data to calculate profit and loss based on underlying market prices or to calculate margin requirements. The normalized private financial data is preferably associated to entitled entities.

In example embodiments, the information processing system is a scalable cloud computing and storage system that supports multiple participant accounts which are entitled to receive selected portions of the enhanced private financial data. One of the participant accounts provides selected portions of the enhanced private financial data to one or more recipients external to the scalable cloud computing and storage system. In example implementations, the scalable cloud computing and storage system supports multiple participant accounts which are entitled to receive selected portions of the enhanced private financial data. It also supports multiple vendor accounts. One of the participant accounts provides selected portions of the enhanced private financial data to one of the vendor accounts for further processing after which the one vendor account performs the distributing step.

In another example embodiment, a real time query is received from an entitled entity and enhanced private financial data is provided in real time responsive to the real time query to the entitled entity.

In another example embodiment, private financial data is automatically removed from the storage associated with the information processing system at a predetermined expiration time.

Another aspect of the technology includes a financial information processing system that includes one or more data processors coupled to one or more participant interfaces, a cloud computing and storage platform, one or more communications networks providing data communication for the one or more data processors and the cloud computing and storage platform. The one or more data processors are configured to:

receive, via the one or more communication networks, from multiple data sources private financial data related to financial articles of trade that are tradable on one or more financial markets, where private financial data is exclusively accessible by only a set of entitled entities associated with the private financial data or transactions involving the private financial data, and where the received private financial data from the multiple data sources includes multiple different data formats;

normalize the private financial data in multiple different data formats received from the multiple data sources into a normalized data format;

store the normalized private financial data in the cloud computing and storage platform (e.g., in a secure, regulated data storage in encrypted format); and process or direct the cloud computing and storage platform to process the normalized private financial data with public financial data to provide enhanced private financial data and thereafter store the enhanced private financial data in the cloud computing and storage platform, wherein the cloud computing and storage platform is configured store the normalized private financial data and to distribute selected portions of the enhanced private financial data to entitled entities with legitimate rights to the selected portions of the enhanced private financial data.

DETAILED DESCRIPTION OF EXAMPLE EMBODIMENTS

This application discloses computer-implemented arrangements and methods. In the following description, for purposes of explanation and not limitation, specific details are set forth such as particular architectures, interfaces, techniques, etc., in order to provide a thorough understanding of the present invention. Those skilled in the art will appreciate that the functions of those blocks may be implemented using individual hardware circuits, using software programs and data in conjunction with one and typically multiple suitably programmed microprocessor or general purpose computers that may also include application specific integrated circuitry (ASIC) and/or digital signal processors (DSPs). Software program instructions and data are stored on computer-readable storage, and when the instructions are executed by a computer or other suitable processor control, the computer or processor performs the functions. Databases and database query technology may be used to storage and access data, e.g., as tables, relational databases, object-based models, and/or distributed databases as well as other formats. Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., one or more data processors and those input devices and output devices that are appropriate to perform the process.

Also, various forms of computer readable media may be involved in carrying data (e.g., sequences of instructions) to a processor. For example, data may be (i) delivered from RAM to a processor; (ii) carried over any type of transmission medium (e.g., wire, wireless, optical, etc.); (iii) formatted and/or transmitted according to numerous formats, standards or protocols, such as Ethernet (or IEEE 802.3), SAP, ATP, Bluetooth, and TCP/IP, TDMA, CDMA, 3G, etc.; and/or (iv) encrypted to ensure privacy or prevent fraud in any of a variety of ways well known in the art.

Many business transactions around the world are executed using digital representations of financial articles of trade residing in computer systems maintained by financial services corporations, and example non-limiting embodiments described below are directed to financial articles of trade to facilitate description, where each represents a financial interest/asset or the right to acquire a financial interest/asset. A financial article of trade is fungible in nature (i.e., equally recognizable and accepted at a variety of places and/or by a variety of parties) and delivered (or communicated/represented) electronically such that there is no (or very minimal) cost or degradation in value from transfer from one physical or logical location to another. Example financial articles of trade include, but are not limited to, rights related to cash, credit, equity securities, debt securities, commodities, futures, options, swaps, foreign exchange values, balances, rates, etc. Financial articles of trade are traded on various complex financial markets with increasingly diverse, numerous, and non-integrated sources of private and non-private data associated with large numbers of disparate trading inputs, processes, and various outputs.

Public data is accessible to anyone and that access may be free or require a fee for access. Non-limiting examples of public financial data includes generalized, market-wide trading data or trading reference data. Private data is data that is not public or accessible to market participants generally through commercial or non-commercial arrangements, but rather, is accessible only by the owners of, or third parties who have been authorized to receive access to, such data. In contrast, market data, for example, can be commercially acquired by anyone.

Private data includes confidential and proprietary data specific to individuals associated with the data and does not need to be disclosed publicly for regulatory, compliance, or other reasons. Private financial data, such as transactional data, margin requirements or calls, trading position information, etc., is exclusively accessible by only a set of entitled entities throughout the trade process. Private data is useful for a wide variety of diverse purposes such as trading/hedging, credit, risk management, internal reporting/analysis/compliance, external regulatory reporting/analysis compliance, display, and viewing. Entities are entitled to access or receive private data only through association with the data or the transactions associated with the data. Such an association may include origination of the data, ownership of the data, serving as the guarantor of transactions associated with the data or authorized regulator of transactions associated with the data, or any other legal or structural association with the data that entitles a party to access the data, e.g., if the owner of the data assigns certain rights to an entity which requires, and is thus entitled, to access the data.

Private financial data from disparate sources are usually formatted differently and may be accessed and/or transmitted using different protocols. Thus, there is a need for technology that can aggregate and normalize private financial data from disparate sources as compared to a private data base comprised of data generated by a common originator(s)/owner(s) of data and accessible by the common originator(s)/owner(s). Plus, there is also a need for technology to securely store, provide access, and distribute selected portions of aggregated, normalized, and preferably enhanced private financial data using computer communication network(s) in a way that ensures only authorized entities are granted access, use, etc., e.g., based on authorization rights attributable to each party. Entitled entities are for instance entitled through association including origination of data, owner of data, any guarantor of transactions associated with the data, any oversight body over the transactions associated with the data. Non-limiting examples of authorized entities in the securities trading applications example, also called participants, include trading firms, brokers, trading members, regulators, investment banks, clearing firms, Central Clearing Parties (CCPs), General Clearing Members (GCMs), an end client, and others.

Example embodiments enable computer-implemented collection and aggregation of private information from a variety of disparate sources, normalization of the collected data, protected storage, and management of the stored data to permit retrieval by and/or distribution to with analysis and/or enhancement of selected portions of the private data either by itself or in combination with other data (public or private) to facilitate controlled access to the different entities involved.

Figure 1:
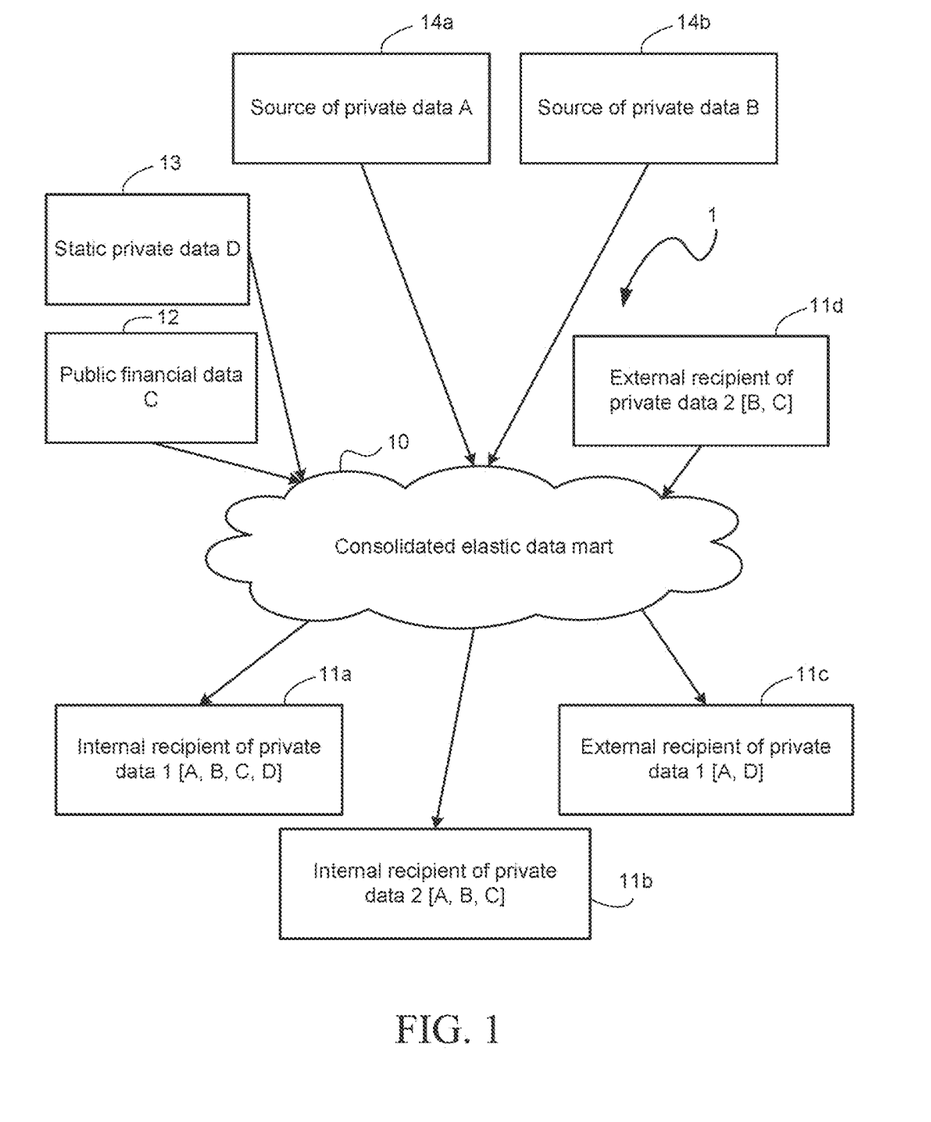
FIG. 1 illustrates an example embodiment of a system for receiving, aggregating, normalizing, storing, and managing private data from multiple disparate private data sources.

FIG. 1 shows one non-limiting example embodiment system configured to collect or receive private data from many disparate and non-disparate sources of private data represented in simplified fashion as 14a (including information designated A) and 14b (including information designated B). Examples of private data include, but are not limited to, drop copy services at exchanges, margin requirements services at CCPs, other brokers and clearing firms with give up trades, etc. Furthermore, the private data may be collected, or received, in any kind of formatted data format, typically as standard data messages, data feeds, or in any other for the purpose suitable format.

The aggregated private data is consolidated in an elastic data mart 10 shown as a data cloud. An elastic data mart is a database, or a collection of databases, designed to help users make strategic decisions. One or more computers may enrich the private data with public data 12 (including information designated C) such as market data, initial margin data, etc. and with static private data 13 (including information designated D) such as reference data, mappings, custom haircuts, etc. Only entitled entities 11a-d may be recipients of the private data or enriched private data. Entitled recipients then receive the consolidated and enriched private data for the purpose of trading/hedging, credit management, risk, internal reporting/analysis/compliance, external regulatory reporting/analysis compliance, and viewing/display. The technology in this application advantageously distributes and/or allows retrieval of certain portions of stored information to different recipients based on the specific portions that each recipient is authorized to receive. In the example shown in FIG. 1, Internal Recipient 1 is authorized to receive information elements A, B, C, and D, whereas Internal Recipient 2 is authorized to receive information elements A, B, and C, External Recipient 1 is authorized to receive information elements A and D, and External Recipient 2 is authorized to receive information elements B and C.

Figure 2:
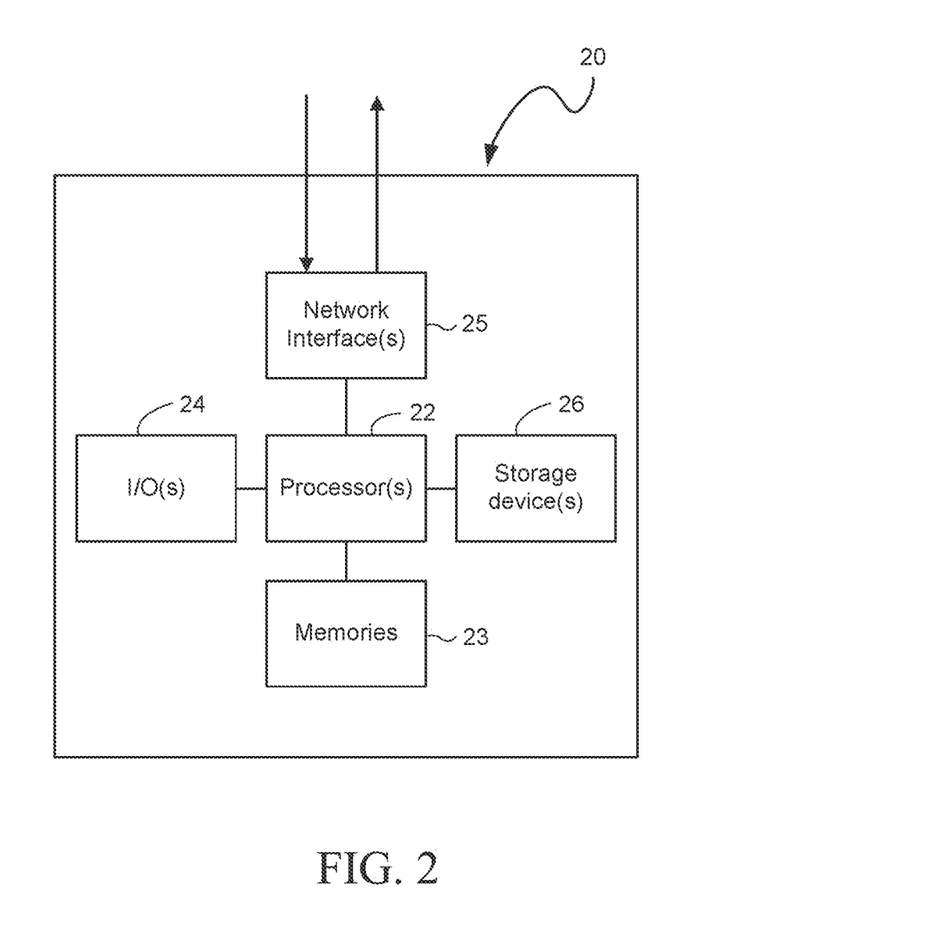
FIG. 2 depicts an example computer system for receiving, aggregating, normalizing, storing, and managing private data from multiple disparate private data sources.

FIG. 2 illustrates an example embodiment of a financial data aggregation and management computer system 20 including one or more processors 22, one or more memories 23, one or more inputs/outputs ("I/O(s)") 24, one or more network interfaces 25, and one or more storage devices 26, all of which operate collectively to execute computer program instructions. One of ordinary skill in the art will recognize that a computer-implemented, financial private data aggregation, storage, and processing system may contain additional components and that FIG. 2 is a high level representation of some of the components and processes of such a computer system for illustrative purposes.

Figure 3:
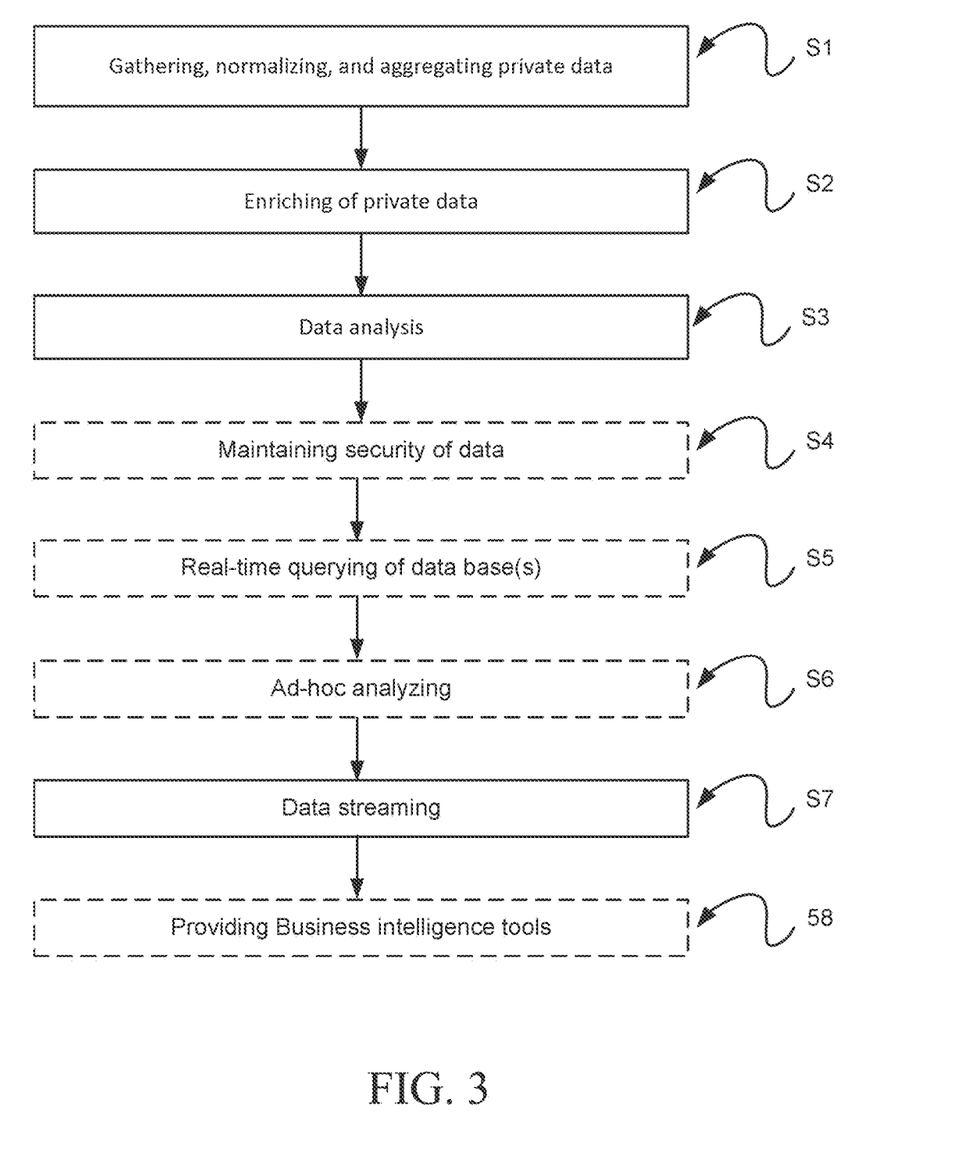
FIG. 3 illustrates a flow chart illustrating example procedures for receiving, aggregating, normalizing, storing, and managing private data from multiple disparate private data sources.

FIG. 3 illustrates a flow chart illustrating example computer-implemented procedures for receiving, aggregating, normalizing, storing, retrieving, enhancing, and providing private enhanced data from multiple disparate private data sources. In step S1, a computer-implemented data storage and processing system gathers, aggregates, and normalizes private financial data from multiple disparate or heterogeneous sources that may use different protocols and formats. Example private data may be received over electronic interfaces from different sources such as for example trading exchanges, dark pools (trading volume or liquidity that is not openly available to the public), and clearing firm/broker/trader logs, clearing houses, etc.

The data may be received in a variety of forms including via a communications network (wired or wireless), computer-readable storage media, operator input, live or batch data feeds, etc. The format of the data received typically varies. Examples include financial industry protocols like the FIX protocol, clients streaming private data via proprietary protocols, through messaging middleware, or other formats. The variously formatted received data is normalized before storage so that it can be aggregated and processed efficiently. As an example, stock for the same company may be purchased and sold at different liquidity destinations using different stock symbols. Statistics for these different stock symbols such as asking price and number of shares are normalized into a comparable and consistent format and then aggregated together. Normalization ensures the private data is converted into comparable and consistent formats and that the data fields contain valid values (data validation). Detailed normalization examples are provided below. The normalized private data is stored in a central or distributed database. One example is a real-time flexible datamart database or collection of databases designed to help managers make strategic decisions about their business. Another example is a data warehouse which combines databases across an entire enterprise. In a preferred example embodiment, the datamart is scalable (by being able to dynamically add more machines to the data cloud/cluster) to a very large size in a cloud storage infrastructure with no degradation of performance.

Once the information is gathered and normalized into a comparable and consistent format, it is then aggregated or grouped together based on common characteristics and information elements. Aggregation of the private data may be performed via an internal, third party, or "entitled entity" provided network infrastructure. The aggregation is handled across multiple machines connected on the network.

In step S2, the computer-implemented system processes the normalized data to provide some enrichment or enhancement of some or all of the normalized and aggregated private data. For example, selected portions of normalized financial data may be processed with certain public financial data (market data and reference data) to allow for example calculation of intra-day profit and loss based on underlying market prices or of margin requirements based on exchange-provided initial margin factors on a per financial article of trade basis. Enrichment of the private financial data provides relevant and useful associations between private data to be made which may be used later by entitled entities to deliver data services based on the stored private data. Associations may for example identify relationships between trade transactions and/or parties associated with the transactions. Other examples of enhancement data includes financial reference data, additional financial instrument identifiers/symbologies, "greek" values often used in options and derivatives trading at the time an order was placed, etc. This step may also include enrichment of private financial data with static private financial data example of which include custom haircuts, allocation relationships, mappings between clearing and trading accounts, overnight positions, posted collateral or margin, etc. One example of leveraging static private data to provide a more detailed analysis of relationships between disparate data elements and associated factors is categorizing trade transactions by the venues they relate to or within the electronic/logical market segments they belong to for that venue.

In step S3, the computer-implemented system maps and analyzes private financial data across multiple assets, multi-markets, clearing houses, currencies, multi-trading systems, global scope and/or regions. Step S2 adds information into the financial data aggregation and management system so as to facilitate potential analysis. Step S3 performs analysis using elements of such additional data. Analyze private data and further enrich with public data for better analysis. For example, enriching the message with public market data of what the related instruments were trading/quoting at when the transaction was submitted.

The security of the private data is maintained, e.g., via encryption by the computer-implemented system, (step S4), while consolidating the data in the system, which again may be a consolidated elastic or scalable datamart.

Step S5 includes optional real-time querying of the datamart by a user or participant for a particular portion of the aggregated and possibly enhanced private financial data for which such party is expressly authorized. For example, a bank that has agreed to extend credit to finance trades submitted by a client may be authorized to view only those transactions consummated by such client using credit extended by the bank.

Step S6 provides an optional ad-hoc analytics/reporting step so that parties with legitimate rights to certain private financial data in the datamart (based on permission, password, encryption key, etc.) define their own reports, have those reports delivered securely, and at what frequency they want to receive those reports (daily, monthly, just one time, etc.) For example, a regulator may be authorized to receive reports of trading activity in a certain stock which involve trading volumes and/or values within a specified time prior to a public announcement by the company that issues such stock which historically have been shown to involve illegal use of "insider information."

Parties with legitimate rights to private financial data in the consolidated datamart may request or subscribe to a real-time data stream of consolidated and aggregated private data for further analysis by computer program-implemented algorithms, either on their own computer system or performed by a third party computer system, or for display and viewing by the party (optional step S7). For instance via a user-defined delivery mechanism (e.g., email, ftp, sftp) may be used to define where and how to send the report to the client.

Optional step S8 provides support for business intelligence integration. For example, computer-implemented business intelligence tools implemented by the user or by a third party may be used to query and then present to entitled entities private data received from the datamart. Examples include data services tools including query functionalities, reporting services, custom on demand analytics tools, and real-time subscription tools. This may involve several steps including an authentication step so that users may only submit queries related to their own private data, defining and submitting queries to pull out private data based on user defined criteria, and formatting the query results in a user defined report layout. A user specified encryption key may be used at the datamart to encrypt the resulting report for delivery to the client.

The above may be executed on a cloud computing network, which is a highly-scalable, dynamic service, allowing cloud computing providers to provide resources to customers over various communication connections. The cloud infrastructure provides a layer of abstraction, such that customers do not require knowledge of the specific infrastructure within the cloud that provides the requested resources. For example, systems such as infrastructure as a service (IaaS), allow customers to rent computers on which to run their own computer applications. Such systems allow scalable deployment of resources, wherein customers create virtual machines, i.e., server instances, to run software of their choice. Customers can create, use, and destroy these virtual machines as needed, with the provider usually charging for the active servers used to seamlessly incorporate the resources allocated to a customer in the cloud network into a customer's existing private enterprise network.

Figure 4:
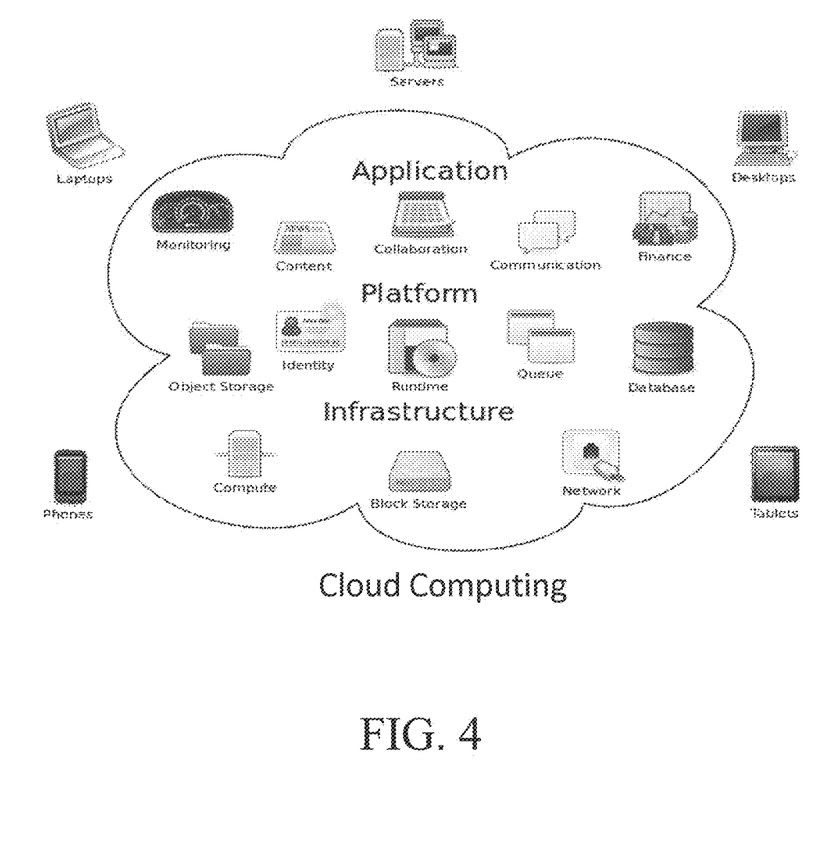
FIG. 4 illustrates conceptually an example cloud computing system.

FIG. 4 illustrates conceptually a general example of a cloud computing and storage system. Cloud computing uses computing resources (hardware and software) that are delivered as a service over a network (e.g., the Internet). Cloud computing entrusts remote services with a user's data, software, and computation, and users are provided access to application software and databases. The cloud provider manages the infrastructure and platforms on which the applications run. End users may access cloud-based applications through a web browser, a light-weight desktop, mobile application, or other computer-implemented device. Benefits of cloud computing includes agility by improving users' ability to re-provision technological infrastructure resources; application programming interface (API) accessibility to software that enables machines to interact with cloud software in the same way the user interface facilitates interaction between humans and computers; reduced cost because the infrastructure is typically provided by a third-party and does not need to be purchased for one-time or infrequent intensive computing tasks; device and location independence to enable users to access systems using a web browser regardless of their location or what device they are using (e.g., PC, mobile phone); virtualization technology allows servers and storage devices to be shared and utilization be increased and applications can be easily migrated from one physical server to another; redundancy; scalability and elasticity via dynamic provisioning of data storage and data processing resources.

Figure 5:
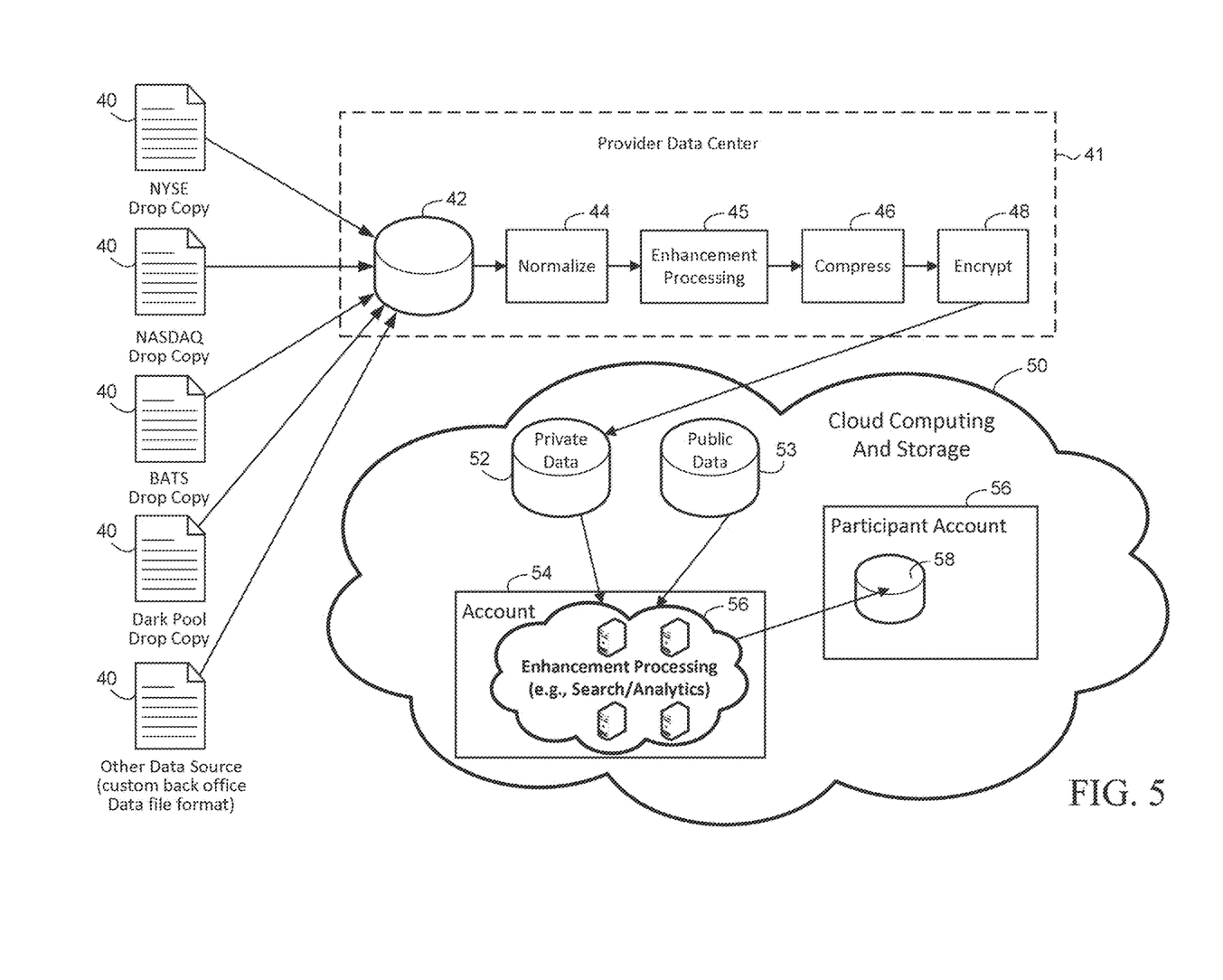
FIG. 5 illustrates an example embodiment of a system for receiving, aggregating, normalizing, storing, and managing private data from multiple disparate private financial data sources.

FIG. 5 illustrates an example embodiment of a cloud computing and storage system 50 for receiving, aggregating, normalizing, enhancing, and storing private financial data from multiple disparate private financial data sources 40 including NYSE drop copy, NASDAQ drop copy, BATS drop copy, dark pool drop copy, and other data sources such as custom back office data files. Financial data from the multiple disparate private financial data sources 40 is received at a provider data center and temporarily stored in an electronic inbox 42 implemented for example using buffer and/or other short term memory. The buffered financial data is then normalized and aggregated 44, possibly processed or enhanced 45, preferably compressed for storage 46, and preferably encrypted 48 before being provided via one or more networks to a private data store database 52 in the cloud computing and storage system 50. The processing stages may be performed for example using one or more computer servers associated with the provider data center 41. The cloud computing and storage system 50 also includes public data storage 53 accessible to the enhancement processing stage 45 in the provider data center 41 and to enhancement processing, such as searching and/or analytics, performed by some data processing resources 56 of the computing and storage system 50 allocated to process and enhance the selected (e.g., queried) portions of private financial data from the private data storage 52 and providing same to a participant account storage 58. Participant refers to an authorized/legitimate entity for which an account is established in the computing and storage system 50 and which receives selected private financial information.

The following is a detailed non-limiting example use case where private financial data is received from multiple disparate sources. The provider data center may collect data from a broker's internal securities order management system(s), securities exchanges such as NASDAQ, NYSE, Direct Edge, BATS, dark pool providers such as Credit Suisse Cross Finder or JP Morgan's JPMX and normalizes and aggregates the data before storing it on behalf of the Participant (in the examples, a "participant" is a securities broker).

Assume that in this non-limiting example use case that the goal for the participant is to receive a private financial data from the private data store 52 for use in creating an ad hoc trade blotter type report for the participant staff. The reports are required for immediate review to address a participant customer question or issue. The customer's private financial data is therefore needed to produce the desired report. That private financial data includes in this example customer trades of securities via two internal participant order management systems (one for access to a participant smart order router while the other is used for routing of securities orders to a specific trader and desk at the participant) and also via direct exchange connections to NASDAQ, BATS and NYSE separate and devoid of the participants physical network and order management infrastructure. As a result, the customer's trade data is processed by a total of five separate disparate sources. The provider data center collects from the exchanges and the participant, all of the messages requiring normalization via electronic drop copies or, as an alternative, flat files.

The received financial data is normalized by electronically parsing securities transactions from electronic messages received from those disparate sources to identify the existence and placement of specific data fields in each message and build a map of these fields to a single common data structure. This common data structure is referred to as a normalized data store. More specifically in this example, received data formats are normalized into JavaScript Object Notation (JSON) objects, which are discrete pieces of data stored in JSON format. A JSON format is a lightweight data-interchange format that is easy for humans to read and write, and for machines to parse and generate. JSON is based on the object notation of the JavaScript language, but does not require JavaScript to read or write because it is a text format that is language independent. A JSON record is a complete set of data JSON objects stored in JSON format. Certain fields are required on every record such as fields used for explicit search/indexing on trade blotters. A trade blotter report includes a record of trades and details of the trades made over a period of time (e.g., one trading day). The details of a trade may include such things as the time, price, order size, and a specification of whether it was a buy or sell order. The blotter is usually created through a computer-implemented trading software program that records the trades made through a data feed. An arbitrary number of additional fields (zero or more) can be part of every record, and do not need to be the same for every record in the system. This allows participant clients to add proprietary data/fields to their records, and also accommodates for the lack of consistency across trade order entry protocols.

The JSON objects are then partitioned into files such that all orders in a given order chain are in the same file but also in a way that any individual file does not exceed a target size. This target size is set to facilitate parallel processing across multiple data processing nodes in a cloud cluster, and also so at given point in time during a search, the memory requirements for a given node are reasonable. This allows the cloud system 50 to scale to searching archives that could extend into the petabyte or exabyte range.

Those files of JSON records are then compressed and finally encrypted, e.g., using an AES-256 encryption key. Encryption keys are preferably rotated per client, per day, so that if a key is compromised, at most one day of one client's data is at risk. This also has the benefit of limiting how much data needs to be re-encrypted if a key revocation process must be performed. The encrypted, compressed, and normalized private financial data is then stored a regulated private data store 52 and made available, in real time or batch methods, for use by a participant authorized to access the regulated private data store 52 within the cloud system 50. An example participant might be a securities broker like Goldman Sachs.

Upon request or schedule, specific data (as defined by the participant) is moved from the regulated private data store 52 to an environment specified by the participant which might be a participant account 56, 58 in the cloud 50 or a dedicated computer infrastructure. This enables the participant to use the normalized data within its own applications examples of which might be transaction cost analysis, transaction surveillance, transaction risk management, portfolio stress testing etc.

A participant logs in (authenticates) to the private data storage system, e.g., through either an online, web-delivered Graphical User Interface (GUI) or an Application Programming Interface (API), and enters a search/retrieval request for private financial data. For example, the participant requests that the provider data center deliver a file, containing specific message files (trade date (MM/DD/YYYY, side (buy, sell, sell short), ticker symbol, quantity (number of shares), price (securities transaction executed price), client identifier (account number), transaction ID, etc. That search is then performed across all JSON records in the cloud system for that client to locate all records matching the search criteria (transactions meeting the participant-defined attributes having occurred across all five of the original trading systems). Files of JSON objects are decrypted and decompressed in memory (so decrypted data is never persisted to disk), and then the JSON records are checked to see if they meet the search criteria. All matching records are copied into a result set of files, and these result set files are compressed and encrypted before delivery to the participant.

The retrieved result set files are copied down to a delivery process, protected behind multiple layers of network security, where the files are decrypted, decompressed, and the results are merged into a single result file. That result file is then compressed, and optionally encrypted with a PGP encryption key (participants may choose to have their results encrypted or not). The result file is then delivered to wherever the participant specifies. For example, the result file may be FTP/SFTP to a participant's server, use the server-client protocol SCP to deliver the file, or the result file may be stored in the cloud storage in a storage account owned by the participant.

The participant receives the file and conducts research based upon it. The participant may execute various processing of that private financial data, including internal processing, or making that file available to another vendor, who may provide some processing service for that data. In the examples in FIGS. 6-8 described below, the exchange of information between cloud participants and vendors may be facilitated by provisioning and permissioning storage "buckets" or containers on the storage platform so that vendors can read participant data delivered by the provider data center 41 to buckets designed for that purpose. In this way, the provider data center 41 can facilitate selecting subsets of private financial data for that participant from the private data storage and make that private data readily available to vendors to provide services using that data all within the cloud platform.

In another non-limiting example use case, a participant requires a scheduled delivery of a defined set of private data from the private data store 52 in the cloud for use in a nightly batch process, e.g., a billing file for customer invoices. The private data includes transactional records for many customers sourced from many disparate systems and stored in the private data store 52. The participant defines a scheduled delivery, e.g., at 8 pm, of all data for all customers fitting a defined criteria to the participant. The private data is delivered, in normalized form, to the participant at the scheduled time. This example use case may be implemented as in the earlier example use case with the addition of a recurring search/retrieval request, where the search criteria are relative to the date/time of when the recurrence pattern repeats (e.g., always select data from 8:00 am to 4:00 pm on the day the search runs). The participant specifies a recurrence pattern such as Monday through Friday, every hour on the hour, between 8:00 am and 4:00 pm.

Another feature includes automatically removing private financial data from the storage at a predetermined expiration time. This is advantageous because keeping this data in storage involves ongoing expenses which may no longer be justified given the passage of time and reduced relevance of data that is no longer considered current or timely.

Figure 6:
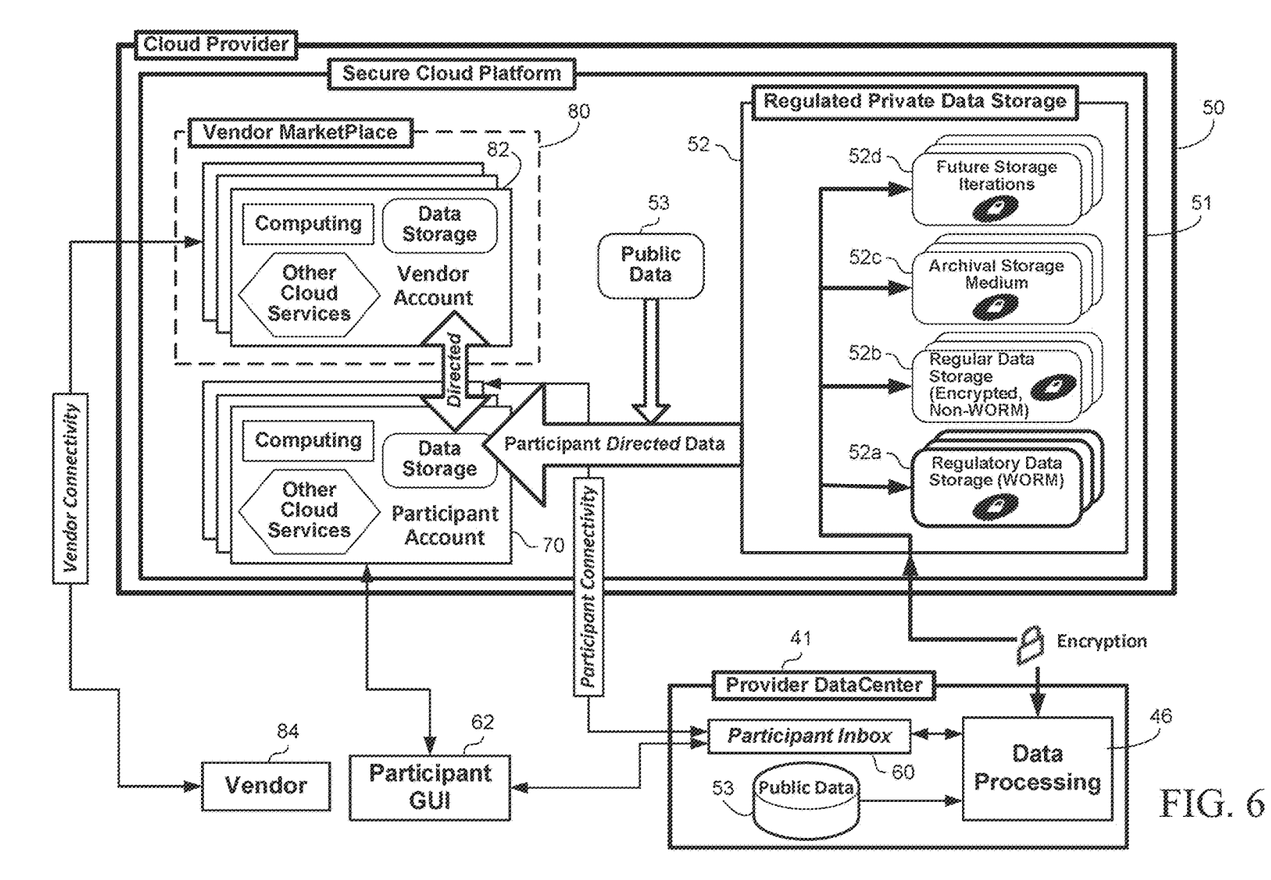
FIGS. 6-8 are function block diagrams illustrating non-limiting example embodiments of the technology applied to different security trading related services scenarios drawing information from multiple disparate security trading data sources.
Figure 7:
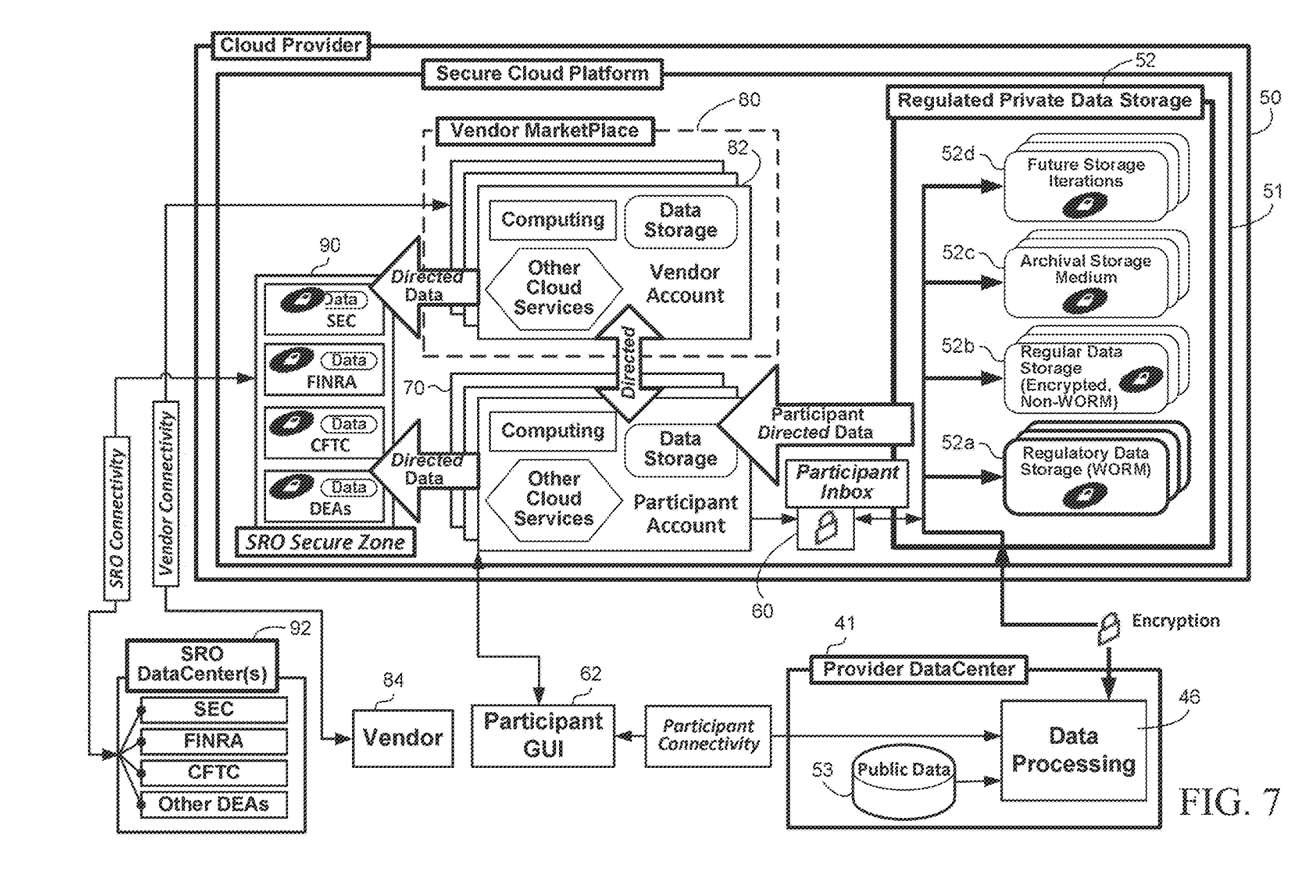
Figure 8:
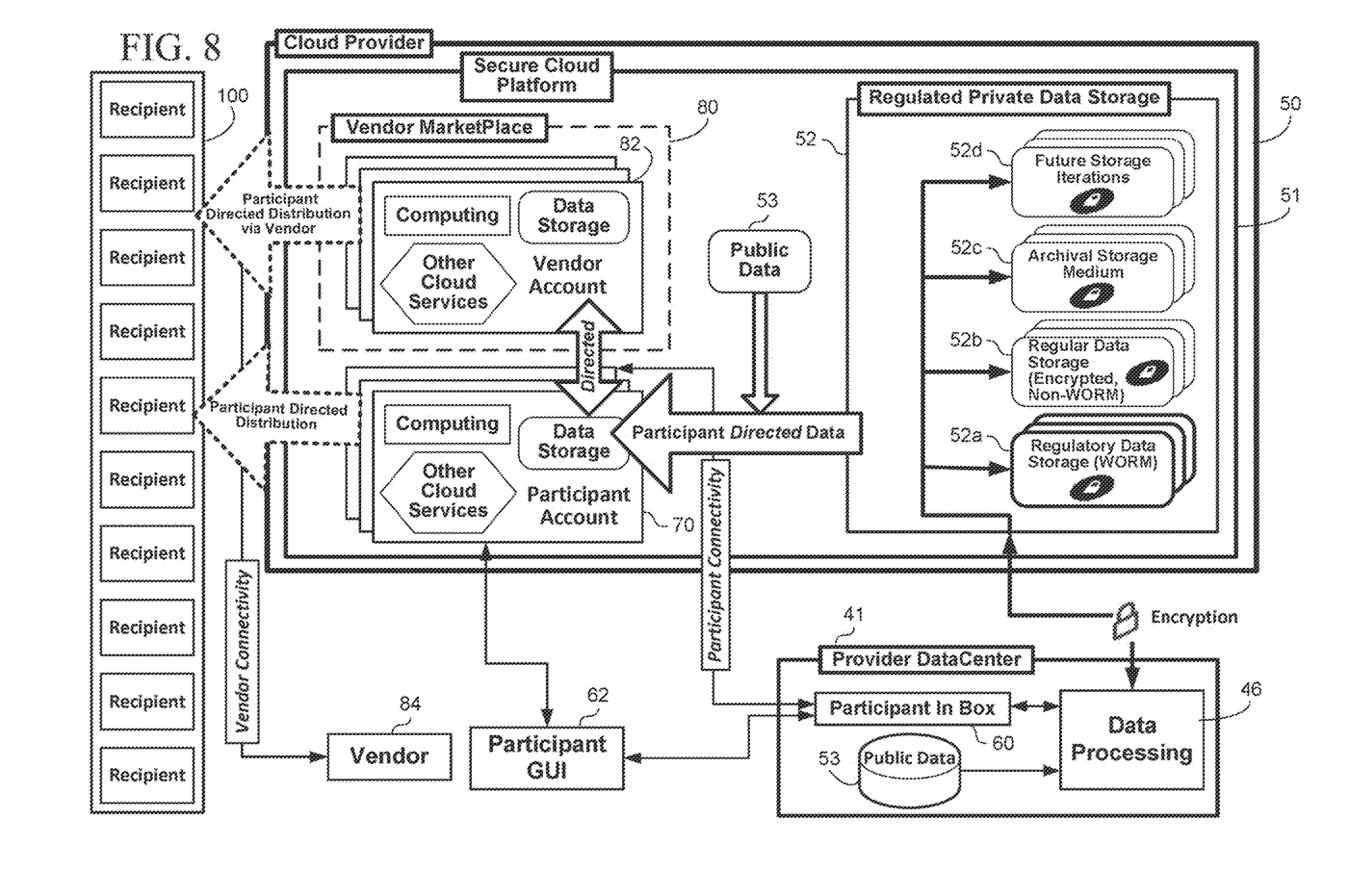

FIGS. 6-8 are function block diagrams illustrating non-limiting example embodiments of the technology applied to different security trading related services scenarios drawing information from multiple disparate security trading data sources. In these figures, the cloud provider 50 may be for example the Amazon Web Services (AWS) cloud platform and the secure cloud platform 51 corresponds to NASDAQ OMX's FinQloud which provides NASDAQ OMX built security, compliance and financial industry-specific functionality to enable users to realize substantial cost savings and achieve unprecedented flexibility over traditional, on-premise computing models. FinQloud is a cloud computing platform exclusively designed for the financial services industry that combines Amazon Web Services' secure, flexible, and cost-effective cloud infrastructure with NASDAQ OMX's experience in providing technology platforms and advisory services for exchanges, regulators, and broker-dealers to provide cost-effective and efficient management and storage of financial data mandated by regulation. FinQloud is a platform for efficient management and storage of financial data that helps market participants streamline operations and aids in management of regulatory compliance requirements without making costly capital expenditures for their underlying infrastructure. FinQloud provides the ability to instantly provision and release compute, storage, and networking resources as needed on a large scale to optimize cost-efficiency while maintaining high performance. For FinQloud participants, this means that resources are always available to meet an immediate business need, no matter how great or how small.

The FinQloud secure platform 51 includes regulated private data storage 52, public data storage 53, participant accounts 70 for multiple participants, and vendor accounts 82 in a vendor marketplace 80. The regulated private data storage 52 includes regulatory data storage 52*a* that is write once, read many (WORM) type memory for storing encrypted private financial data, regular data storage 52*b* for storing encrypted data, which may also be private financial data but not in WORM memory, archival storage 52*c* for archiving older encrypted data, and future storage 52*d*. Further details of one example regulated data storage are provided in commonly assigned U.S. provisional patent application 61/703,429, filed on Sep. 20, 2012, entitled "Regulatory Records Retention (R3) System and Method," the disclosure of which is incorporated herein by reference.

Each participant account 70 and each vendor account 82 has access to cloud computing, cloud storage, and other cloud services. A provider data center 41, hosted in this example by NASDAQ OMX, includes a participant "inbox" 60 for receiving private financial information and query requests from a participant GUI 62. The inbox 60 is coupled to one or more data processors 46, e.g., computer servers. A database memory 53 storing public data may also be coupled to the data processors 46. The data processors 46 process the private financial data and optionally enhance it with public data from storage 53 before encrypting the private financial data and sending it to the regulated private data storage 52 for secure storage.

In FIG. 6, the Participant may request that specifically-identified private data be copied from the Regulatory Data Storage (WORM) 52a and directed to the Participant's account 70 on the secure cloud platform 51 and/or copied or withdrawn from Regular Data Storage (Encrypted, Non-WORM) 52b, Archival Storage Medium 52c, or other Storage 52d, and directed to the Participant's account 70 for computing, data storage, or other cloud services within the overall secure cloud platform 51. Alternatively, the Participant may choose to input information for computing, data storage, or other cloud services within the Participant's account 70 from the Participant Inbox 60 and/or the Participant Graphical User Interface (GUI) 62. The Participant may also direct information from data storage or resulting from computing or other cloud services associated with the Participant's account 70 to a vendor account 82 located within a Vendor Marketplace 80 where such vendor may provide services related to data storage, computing, and/or other cloud services. The results of such vendor services may be directed from the vendor account 82 back to the Participant account 70. Information and other resources necessary for the vendor to provide such services may originate external to the secure cloud platform 51.

FIG. 7 illustrates a more detailed but still non-limiting example of the scenario shown in FIG. 6 for the FinQloud platform in which private financial data is directed to self-regulating organizations (SROs) in an SRO secure zone 90. Example financial type SROs include the Securities Exchange Commission (SEC), the Financial Industry Regulatory Agency (FINRA), the Commodity Futures trading Commission (CFTC), and/or Designated Examining Authorities (DEAs), which are connected to respective data centers 92. A Participant 70 directs that specified private data and/or private data enhanced with public data be sent to one of several SROs who have jurisdiction over the Participant's activities such as the SEC, FINRA, CFTC, or DEAs. So rather than having to develop "one-off" technical solutions to respond to regulatory initiatives/requests of each of the SEC, FINRA, CFRC, or DEAs, the secure cloud platform is used to direct specified information to such organization(s) 90 which they can in turn make use of in their own data center(s) 92. Although many of the function blocks are similar to those in FIG. 6, the participant cloud inbox 60 is located within the FinQloud platform in this example to enable the Participant to input secure encrypted data into the Regulated Private Data Store 52 without requiring that it be input via the Provider Data Center 41.

The configuration for the non-limiting example scenario in FIG. 8 is similar to that for the non-limiting example scenario in FIG. 6. However, in FIG. 8, a Participant directs that specified private data and/or private data enhanced with public data to be sent to one or more recipients 100 who have legitimate rights to such data but are not located within the secure cloud platform 51. The Participant may instruct that this data be delivered to specified recipients 100 directly or may enlist the assistance of a vendor 82 to provide delivery. So rather than having to develop "one-off" technical solutions to meet the disparate needs of different recipients 100, a Participant leverages the capabilities of the secure cloud platform to direct specified information to each recipient 100 based on facts and circumstances applicable to that recipient. Non-limiting examples include directing proxy information to facilitate voting by corporate stockholder recipients or directing tax information to investor client recipients 100.

Various example embodiments, also related to a method of sending packets received from a private data source to an entitled destination in a cloud network. This may involve a logical client edge router in a computer system receiving a packet from a private source, querying a directory server for the destination's cloud IP address and location IP address, encapsulating the received packet when the entitled client edge router determines that the destination is within the entitled space, further encapsulating the received packet with the entitled destination's corresponding location IP header, and forwarding the received packet to the entitled destination, wherein the logical client edge router forwards the received packet through the destination location IP address to the destination cloud IP address.

Although the description above contains many specifics, these should not be construed as limiting the scope of the claims but as merely providing illustrations of example embodiments. For example, even though many of the detailed example embodiments relate to private and public financial data, those skilled in the art will appreciate that the technology may also be applied to other types of private and public data. It will also be appreciated that the technology claimed fully encompasses other embodiments which may become apparent to those skilled in the art, and that the scope of the claims is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved for it to be encompassed hereby. No element, block, or instruction used in the present application should be construed as critical or essential to the implementations described herein unless explicitly described as such. Further, the phrase "based on" is intended to mean "based, at least in part, on" unless explicitly stated otherwise. Unclaimed subject matter is not dedicated to the public and Applicant reserves all rights in unclaimed subject matter including the right to claim such subject matter in this and other applications, e.g., continuations, continuations in part, divisions, etc.

The invention claimed is:

1. A distributed computing platform comprising:
   a first computer system that includes one or more data hardware processors coupled to a transceiver, wherein the transceiver is configured to:
   receive a first plurality of electronic data transaction messages from a plurality of different exchange computer systems, each one of the plurality of electronic data transaction messages including data fields that reflect how a corresponding one of the plurality of different exchange computer systems processed a corresponding electronic order submitted thereto, and receive a second plurality of electronic data messages from a plurality of different participant computer systems that each submit orders to different ones of the plurality of different exchange computer systems for execution thereby, wherein the first plurality of electronic data transaction messages and the second plurality of electronic data messages are in different data formats;

wherein the one or more hardware processors is configured to:
generate a combined first data set that is in JavaScript Object Notation (JSON) format by parsing securities transactions from the first plurality of electronic data transaction messages and the second plurality of electronic data messages to identify specific data fields for each security transaction, and then mapping those data fields to data elements of the combined first data set,
partition the combined first data set into a plurality files, wherein orders that are part of the same order chain are determined to be partitioned into the same file,
encrypt the plurality of files using a first encryption key, and
transmit the encrypted plurality of files for storage on another computer system;

a cloud-based computer system that includes a plurality of computing nodes, with each comprising hardware processing resources, each one of the plurality of computing nodes executing one or more virtual machines, the cloud-based computer system providing for dynamic scaling of the computing nodes that are allocated for handling processing and/or storage of data communicated from the first computer system;

a secure storage system under control of at least one of the plurality of computing nodes of the cloud-based computer system, the cloud-based computer system comprising:
a first data store configured to accept data that is written thereto, wherein once data is written to the first data store it can only be read, but not deleted or modified until being automatically deleted in response to expiration of a retention period,
a plurality of participant data stores that are each respectively associated with a corresponding one of a plurality of participant accounts of a plurality of participants; and wherein the hardware processing resources of the cloud-based computer system are configured to:
receive the transmitted encrypted plurality of files from the first computer system,
write the encrypted plurality of files that are in JSON to the first data store, wherein the plurality of files that are written to the first data store are readable a plurality of times after the initial writing, but after the initial writing of the corresponding plurality of files cannot be deleted or modified until being automatically deleted in response to expiration of a retention period,
receive a search query for data that is contained in the first data set that is spread across the plurality of files that are in JSON,
execute the search query in parallel across multiple ones of the plurality of computing nodes and on each of those nodes decrypt a corresponding subset of the plurality of encrypted files that are stored to the first data store, wherein individual files of the plurality of encrypted files are assigned to the same computing node for processing, wherein the files are only decrypted in memory of the corresponding computing node and not persisted to non-volatile storage,
determine, for each computing node that is executing the search query, whether data in the unencrypted files is responsive to the search query,
compile responsive data to the search query to a result file and encrypt the result file, and
deliver the result file to the participant data store that corresponds to the participant that submitted the search query.

2. The distributed computing platform of claim 1, wherein each transaction is a different JSON object within a corresponding file.

3. The distributed computing platform of claim 1, wherein the combined first data set includes additional fields that are later usable by participants.

4. The distributed computing platform of claim 1, wherein a size of each one of the plurality of files is maintained to be less than a target size for facilitating parallel processing of the plurality of files.

5. The distributed computing platform of claim 1, wherein the first encryption key is changed each day for the generation of each new first data set.

6. The distributed computing platform of claim 1, wherein the first data set is divided into participant specific portions and files that correspond to the participant specific portions are encrypted using a different encryption key.

7. The distributed computing platform of claim 1, wherein the first data set is further based on a public data set.

8. The distributed computing platform of claim 1, wherein the first plurality of electronic data transaction messages include data messages of drop copies from a corresponding exchange computer system.

9. A method implemented on a distributed computing platform that includes first computer system, a cloud-based computer system, and a secure storage system under control of at least one of a plurality of computing nodes of the cloud-based computer system, the secure storage system including a first data store configured to accept data that is written thereto, wherein once data is written to the first data store it can only be read, but not deleted or modified until being automatically deleted in response to expiration of a retention period, a plurality of participant data stores that are each respectively associated with a corresponding one of a plurality of participant accounts of a plurality of participants, the method comprising:
receiving a first plurality of electronic data transaction messages from a plurality of different exchange computer systems, each one of the plurality of electronic data transaction messages including data fields that reflect how a corresponding one of the plurality of different exchange computer systems processed a corresponding electronic order submitted thereto;
receiving a second plurality of electronic data messages from a plurality of different participant computer systems that each submit orders to different ones of the plurality of different exchange computer systems for execution thereby, wherein the first plurality of electronic data transaction messages and the second plurality of electronic data messages are in different data formats;
generating a combined first data set that is in JavaScript Object Notation (JSON) format by parsing securities transactions from the first plurality of electronic data transaction messages and the second plurality of electronic data messages to identify specific data fields for each security transaction, and then mapping those data fields to data elements of the combined first data set;

partitioning the combined first data set into a plurality files, wherein orders that are part of the same order chain are determined to be partitioned into the same file;

encrypting the plurality of files using a first encryption key;

writing the encrypted plurality of files that are in JSON to the first data store, wherein the plurality of files that are written to the first data store are readable a plurality of times after the initial writing, but after the initial writing of the corresponding plurality of files cannot be deleted or modified until being automatically deleted in response to expiration of a retention period;

executing a search query in parallel across multiple ones of the plurality of computing nodes and on each of those nodes decrypt a corresponding subset of the plurality of encrypted files that are stored to the first data store, wherein individual files of the plurality of encrypted files are assigned to the same computing node for processing, wherein the files are only decrypted in memory of the corresponding computing node and not persisted to non-volatile storage;

determining, for each computing node that is executing the search query, whether data in the unencrypted files is responsive to the search query;

compiling responsive data to the search query to a result file and encrypt the result file; and delivering the result file to the participant data store that corresponds to the participant that submitted the search query.

10. The method of claim 9, wherein each transaction is a different JSON object within a corresponding file.

11. The method of claim 9, wherein the combined first data set includes additional fields that are later usable by participants.

12. The method of claim 9, wherein a size of each one of the plurality of files is maintained to be less than a target size for facilitating parallel processing of the plurality of files.

13. The method of claim 9, wherein the first encryption key is changed each day for the generation of each new first data set.

14. The method of claim 9, wherein the first data set is divided into participant specific portions and files that correspond to the participant specific portions are encrypted using a different encryption key.

15. The method of claim 9, wherein the first data set is further based on a public data set.

16. The method of claim 9, wherein the first plurality of electronic data transaction messages include data messages of drop copies from a corresponding exchange computer system.

* * * * *